UNITED STATES PATENT OFFICE.

NATHANIEL JENKINS, OF BOSTON, MASSACHUSETTS.

IMPROVED PACKING FOR JOINTS, VALVES, &c.

Specification forming part of Letters Patent No. 69,811, dated October 15, 1867.

*To all whom it may concern:*

Be it known that I, NATHANIEL JENKINS, of Boston, in the county of Suffolk and State of Massachusetts, have invented a new and useful Packing for Joints and Valves; and I do hereby declare that the following is a full, clear, and exact description of the composition and employment of the same.

Valves, cocks, and joints through which hot fluids pass are difficult to pack tight, and the only way to make a perfect packing is to employ a substance somewhat elastic, so that the packing may adapt itself somewhat to the valve-seat or joint to be tightened. In fact, a packing should possess the general properties of a colloid, while at the same time it should not be acted on by heat, or by corrosive qualities of the fluid passing it.

A compound of vulcanized rubber so prepared as to be very slightly affected by heat presents the best conditions, and a mixture of pulverized mica and charcoal with such rubber serves to give the very best results.

The following receipt gives excellent proportions for a packing to valves for passing hot petroleum-oils; caoutchouc, eight (8) pounds; pulverized mica, fifteen (15) pounds; shellac, four (4) pounds; pulverized soap-stone, three (3) pounds; sulphur, one (1) pound; lamp-black, one (1) pound; pulverized wood charcoal, one (1) pound. The caoutchouc is in plates or slices, the other ingredients in fine powder, and, intimately mixed, are spread upon the caoutchouc and rolled in, after which the whole is vulcanized in molds in the usual way.

For high steam the relative amount of rubber and shellac would be decreased, the rubber about a sixth, the shellac about a third, and about two and a half pounds of plumbago added.

The two substances which seem to have the protecting influence against the destructive effects of steam or heat are the mica and wood charcoal. This latter cannot be substituted by plumbago or lamp-black with satisfactory results, and the proportions employed of mica and wood charcoal may be varied within certain limits, the quantity of charcoal being doubled and that of mica decreased in equal quantity without material alteration of the properties of the packing.

I claim as my invention and desire to secure by Letters Patent—

1. The employment of pulverized mica intimately mixed before vulcanizing with the constituents of vulcanized rubber, as and for the purpose described.

2. And the employment of pulverized wood charcoal intimately mixed before vulcanizing with the constituents of vulcanized rubber, as and for the purpose described.

NATH. JENKINS.

Witnesses:
 THOS. WM. CHEEVER,
 JOHN B. PIZER.